L. LACEY.
Corn-Planters.
No. 138,259. Patented April 29, 1873.
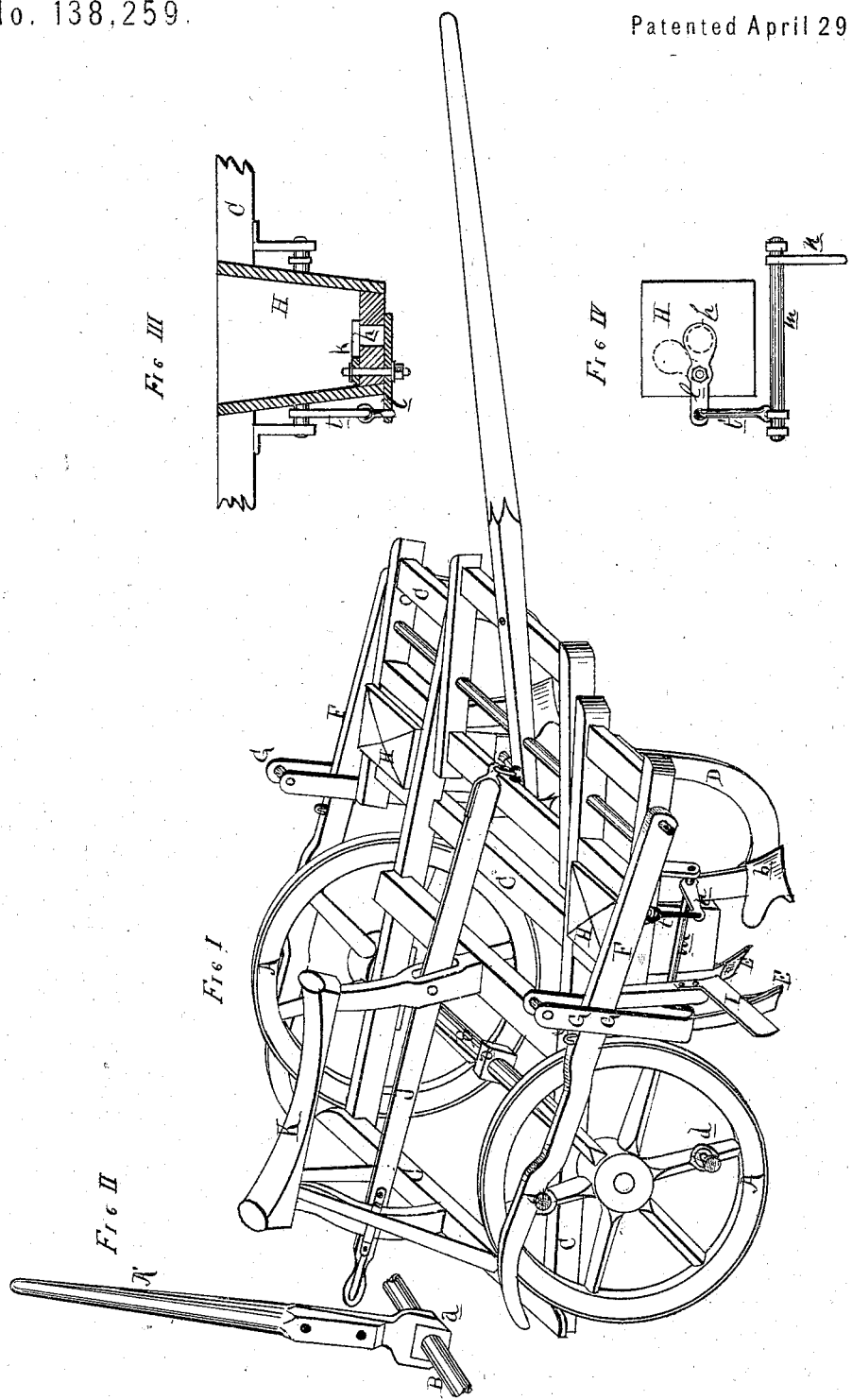
Witnesses
H. C. Clark
H. E. Matthews
Inventor.
Lester Lacey
By Dyer, Beadle & Co.
Ass' Att'ys

UNITED STATES PATENT OFFICE.

LESLIE LACEY, OF BATH, ILLINOIS.

IMPROVEMENT IN CORN-PLANTERS.

Specification forming part of Letters Patent No. 138,259, dated April 29, 1873; application filed October 19, 1872.

*To all whom it may concern:*

Be it known that I, LESLIE LACEY, of Bath, in the county of Mason, and State of Illinois, have invented a new and useful Improvement in Corn-Planters; and I do declare that the following is a true and accurate description thereof, reference being had to the accompanying drawing and to the letters of reference marked thereon and being a part of this specification, in which—

Figure 1 is a perspective view of my improved implement. Fig. 2 is a perspective of the detached lever. Fig. 3 is a vertical section through the seed-boxes. Fig. 4 is a plan of the bottom of the seed-boxes and their attachments.

Like letters indicate like parts in each figure.

The nature of this invention relates to the construction of what I term a self-dropping check-row corn-planter. The invention consists in the arrangement and combination of the various parts, as more fully hereinafter described.

In the accompanying drawing, A represents the driving-wheels, rigidly secured to the axle B, upon which is secured a square nut, $a$, or other suitable device, upon which the detached lever A' fits, to turn the wheels to compel the machine to mark corresponding rows. Upon this axle B is suitably journaled the frame C, which carries the operating parts of the machine. D are runners, secured to the front end of the frame, and terminate in furrow-openers $b$, which open furrows of sufficient width to allow the corn to spread over several inches of ground when the seed is dropped. The two small plows E, which follow each one of the furrow-openers, are intended to cover the grain with loose earth, and make a small ridge on the row, which will protect the corn from standing water and allow the corn to be cultivated when smaller than could be done when the planter-wheel passes over it. These plows are secured, by means of proper standards, to the frame, and each turns a furrow toward the row. F are dropping-levers, and are attached by suitable bolts to the side of the forward end of the main frame; they are held in place by the guides on the outside of the frame, just in the rear of the grain-boxes. In the rotation of the wheels A these levers are elevated by engagement with the studs $d$, which are attached to the spokes of the wheels. On being carried up to the proper height, the studs pass through slots (not shown) on the inner sides of the levers, and the latter fall to their original position by their own gravity. H are feed-grain boxes, secured to the frame, the openings through which the seed passes being marked $h$, and situated between the furrow-openers and the covering-plows. In the bottoms of these grain-boxes are strikes $k$, which, when the openings $h$ are full of seed, cut off the flow, while the valves $l$, which close the bottoms of the openings, are thrown open to allow the seed to drop. The dropping-levers F are connected to these strikes and valves by means of the small levers $m$, cranks $n$, and links $t$, in such a manner that the dropping of the levers will operate the strikes and covers to produce the result described, and allow the grain to fall into the furrows. At the same time the foot-piece I, pendent from the dropping-levers, makes a mark directly opposite where the grain is dropped, so that the next row can be dropped to correspond, thereby insuring check and straight rows, and avoiding the necessity of marking off the ground before commencing to plant. J is a lever, extending from front to rear, and under the seat K, and is designed to be used to raise the runners from the ground in turning.

What I claim as my invention, and desire to secure by Letters Patent, is—

The combination of the dropping-levers F, the link $t$, crank $n$, and lever $m$, and rod $t'$ with the oscillating valve L in the hopper H, as described.

LESLIE LACEY.

Witnesses:
JOHN N. HOLE,
ISAAC N. WARE.